United States Patent [19]

Le Cardonnel et al.

[11] 4,045,622
[45] Aug. 30, 1977

[54] METHOD OF MONITORING A NETWORK OF PERIPHERAL ELEMENTS HANDLED BY AN ELECTRONIC CONTROL UNIT

[75] Inventors: Gerard Le Cardonnel; Pierre Gravez; René Marc Favre, all of Paris, France

[73] Assignee: Thomson-CSF, Paris, France

[21] Appl. No.: 672,886

[22] Filed: Apr. 2, 1976

[30] Foreign Application Priority Data

Apr. 4, 1975 France .................... 75.10625

[51] Int. Cl.$^2$ ............................. H04M 3/26
[52] U.S. Cl. .................. 179/175.2 C; 179/175.2 R
[58] Field of Search .............. 179/175.2 C, 175.2 R; 324/133

[56] References Cited

U.S. PATENT DOCUMENTS

| 3,206,729 | 9/1965 | Longcroft | 179/175.2 R |
|---|---|---|---|
| 3,604,860 | 9/1971 | Buchheit | 179/175.2 R |
| 3,659,044 | 4/1972 | Olson | 179/175.2 R |
| 3,713,103 | 1/1973 | Risky | 179/175.2 C |
| 3,713,104 | 1/1973 | Stich | 179/175.2 C |

FOREIGN PATENT DOCUMENTS

| 1,470,867 | 1/1967 | France |
|---|---|---|
| 2,217,891 | 9/1974 | France |
| 1,083,345 | 6/1960 | Germany |
| 1,073,552 | 1/1960 | Germany |
| 1,138,112 | 10/1962 | Germany |
| 1,512,089 | 4/1969 | Germany |

*Primary Examiner*—Douglas W. Olms
*Attorney, Agent, or Firm*—Oblon, Fisher, Spivak, McClelland & Maier

[57] ABSTRACT

A method for avoiding interference with the "logic" section of an electronic central control unit by the voltages manipulated in a network of peripheral elements, for instance in a telephone switching system, is provided. The method according to the invention uses generators which transmit recurring test pulses along two-wire lines coupled by transformers with amplifiers delivering pulses, staggered in amplitude and time, into a network of peripheral elements. Depending upon the state of these elements pulses are retransmitted, or are not retransmitted, to the base of a bipolar transistor which opens or closes a two-wire line coupled by a transformer to a receiver of the central control unit.

7 Claims, 3 Drawing Figures

METHOD OF MONITORING A NETWORK OF PERIPHERAL ELEMENTS HANDLED BY AN ELECTRONIC CONTROL UNIT

BACKGROUND OF THE INVENTION

This invention relates to a method of monitoring a network of peripheral elements handled by an electronic control unit, and to an arrangement for applying this method, especially in telephonic switching.

The object of the method according to the invention is to solve a problem which arises in the case of a network of centrally controlled elements, comprising a central unit of the electronic computer type connected by wire to the elements of the network when the network is the centre of d.c and/or a.c voltages of a higher order of magnitude than the feed voltages of the central unit. This is particularly the case with lines of a telephone network (fed with 48 volts) switched electronically by a central unit of which the logic elements are fed with voltages of the order of 1 volt. The network and its elements in the process of operation are sources of parasitic pulses of which the transmission by connecting wires is in danger of interfering with the operation of the logic circuits of the central unit by causing the appearance of a large number of "faults" which are incompatible with the reliability of the switching system.

Accordingly, it is advisable to isolate the feed voltages of the network and the central unit from one another whilst at the same time enabling the central unit to monitor the momentary position of the elements of the network to be handled by the central control unit. In particular, precautions have to be taken to prevent the transmission of parasitic pulses by the connecting wires.

One possible solution to this problem would be to use radioelectric transmission. This would involve installing pairs of transmitters and receivers at a rate of at least one pair per element handled. When there are numerous elements, which is especially the case in a switching centre where numerous telephone lines have to be handled, the installation costs would be very high. In addition, this solution would not completely eliminate the difficulties caused by the parasitic pulses, part of whose frequency spectrum would definitely fall within the transmission channel used by certain pairs of emitters and receivers.

Another possible solution would be to install photocouplers in the monitoring lines between the "network" side and the "central" side, but conventional photocouplers are not very fast and have a relatively short service life.

The solution provided by the present invention does not have any of the disadvantages referred to above.

SUMMARY OF THE INVENTION

According to the invention, there is provided a method of monitoring a network of $n$ groups of $m$ peripheral elements, $m$ being an integer greater than 1 and $n$ an integer greater than 2, said elements being handled by an electronic control unit, said network being of the type in which the state of each element may be expressed in the form of a binary digit collected on each of $m$ separate channels, wherein said method comprises:

transmitting along $n$ two-wire channels recurring test pulses staggered as a function of time by an interval equal at most to the nth part of the recurrence interval of said test pulses, each two-wire channel comprising means for decoupling d.c potentials;

translating the state of an element $j$ ($j$ = integer variable from 1 to $m$) of said group of $m$ elements in the form of a "loop" state or "non-loop" state of a two-wire line connecting the network of elements to the control unit, each loop state being synchronous with a test pulse;

transforming the non-loop states into retransmissions of pulses synchronised with the test pulses.

BRIEF DESCRIPTION OF THE DRAWINGS

The invention is described in more detail in the following with reference to the accompanying drawings; wherein.

DESCRIPTION OF THE PREFERRED EMBODIMENTS

Figure 1:
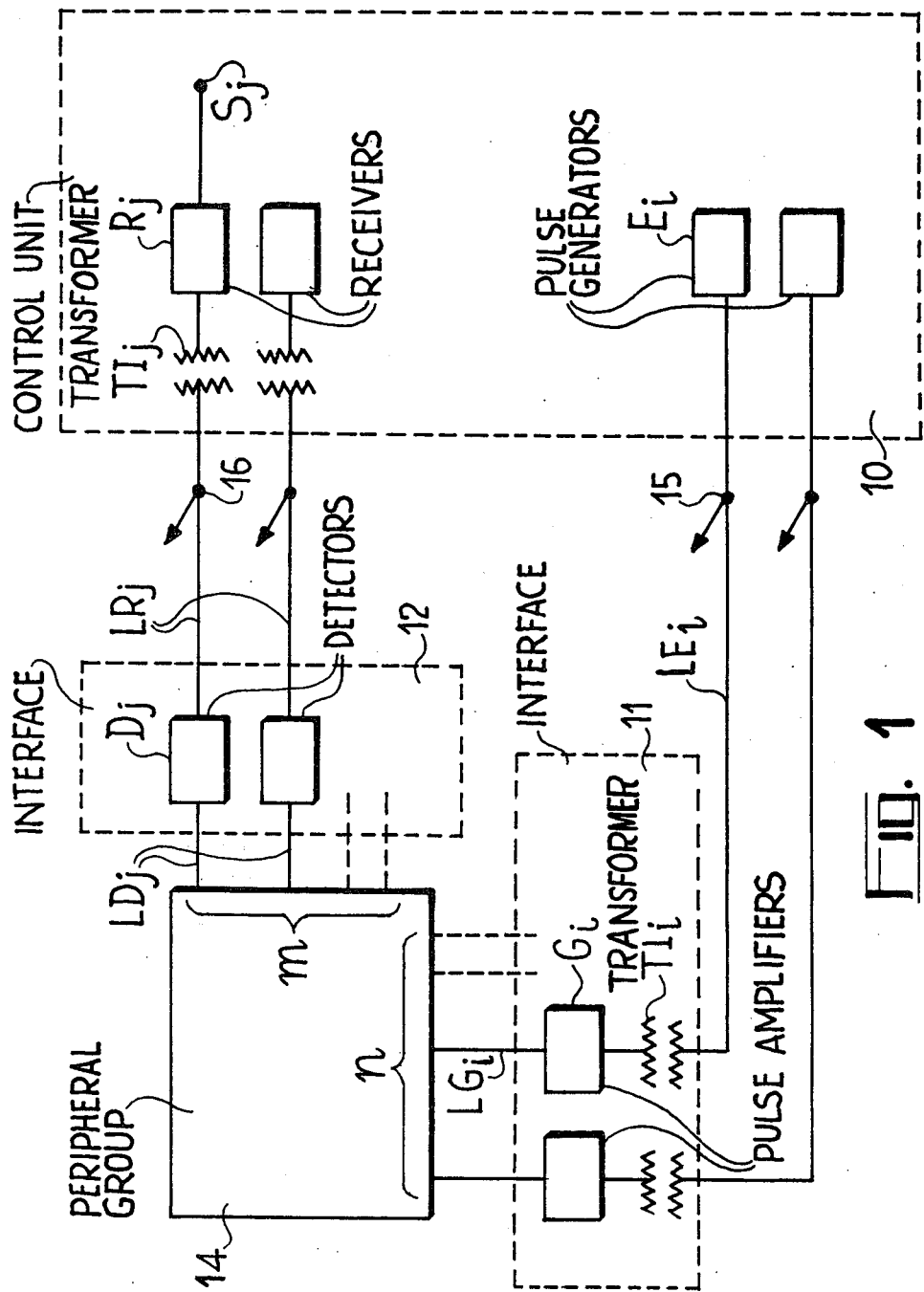
FIG. 1 diagrammatically illustrates an arrangement for applying the method according to the invention.

Referring now to the drawings, wherein like reference numerals designate identical or corresponding parts, and more particularly to FIG. 1 thereof, generally, an arrangement for applying the method according to the invention comprises:

on the side of the central control unit (represented in FIG. 1 by a rectangle 10 in chain lines), $n$ pulse generators $E_i$ ($i$ being an integer from 1 to $n$) and $m$ "receivers" $R_j$ ($j$ being an integer from 1 to $m$);

on the side of the peripheral elements forming a complex (represented by a rectangle 14), two interfaces denoted by the references 11 and 12 in FIG. 1 and containing connections, described hereinafter, between the pulse generators and the complex 14 on the one hand and between the complex 14 and the receivers on the other hand.

The two-wire lines are represented by a single line in FIG. 1.

Each pulse generator $E_i$ permanently transmits brief pulses with a long recurrence interval along a two-wire line $LE_i$. By way of example, FIG. 3 (diagram $a$ with the axis OV for the voltages and the axis Ot for the times) shows the curve of one such test pulse $W_1$ with an amplitude of 5 volts and a duration of 4 microseconds, transmitted by the generator $E_i$ every 10 milliseconds. Since the ratio between the recurrence interval and the duration is 2500, illustration to scale has only been possible by interrupting the axis Ot between two pulses.

The pulses $W_1$ of the $n$ generators $E_i$ are staggered relative to one another, for example by a few microseconds, so as to enable the group of $m$ elements tested to be identified.

Figure 3:
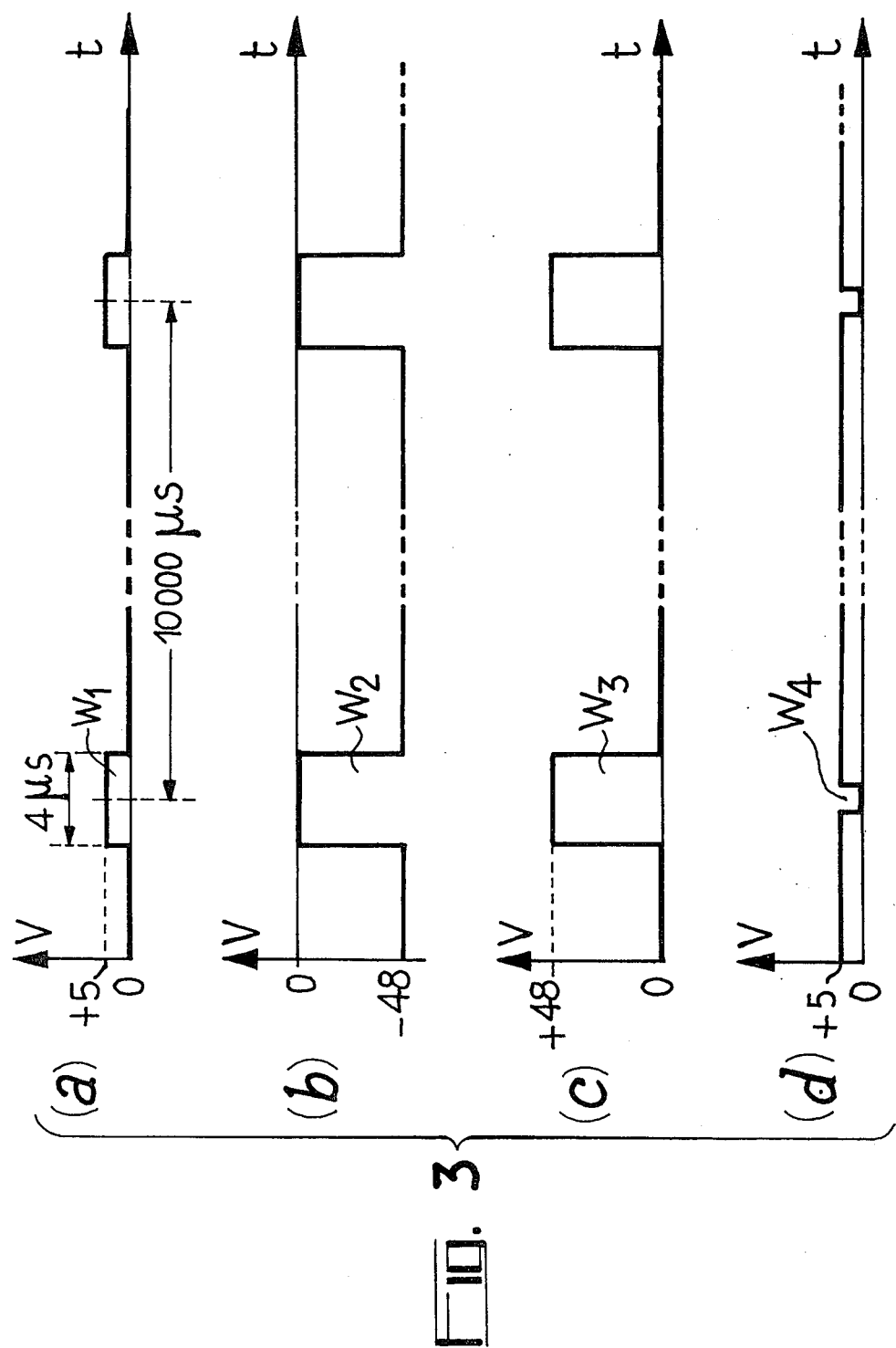
FIG. 3 ($a$–$d$) shows pulse diagrams.

Each receiver $R_j$ is fed with pulses $W_4$ shown in FIG. 3 (diagram $d$) by a pulse source (not shown) which is synchronised with the pulse generator $E_i$. These pulses have the same recurrence interval as the pulses $W_1$, although their duration, which is shorter than that of $W_1$, is completely included within the period of appearance of $W_1$.

The lines $LE_i$ enter the interface 11 comprising transformers $TI_i$ and pulse amplifiers $G_i$. Each transformer $TI_i$ is a so-called "pulse" transformer, i.e. a transformer whose "bandwidth" comprises frequencies high enough not to deform the pulses $W_1$ too seriously. The output of the transformer $TI_i$ is connected to the input of the amplifier $G_i$. This amplifier of a type known per se, delivers pulses $W_2$ synchronous with the pulses $W_1$ whilst at the same time amplifying voltage and translating the d.c potential. By way of example, in FIG. 3, diagram b, the pulse $W_2$ is represented by a rectangle included within the ordinate lines O and −48 volts. In FIG. 1, the rectangle 14 represents a complex of n groups of m peripheral elements. The complex of elements comprises n inputs connected by lines $LG_i$ to the outputs of the amplifiers $G_i$, and m outputs connected by lines $LD_j$ to the elements of the interface 12.

The elements of the complex to be controlled are capable of being in two different states which may be called "1" and "0" characterising for example their state of connection or disconnection. In the state 1, a pulse $W_2$ arriving by a line $LG_i$ is transmitted in the form of a pulse $W_3$ (FIG. 3, diagram c) along a line $LD_j$ connected to the element of order j in the "column" of elements fed by the line $LG_i$. In the state 0, the pulse $W_3$ is not transmitted to this element. The interface 12 comprises detectors $D_j$, which will be described hereinafter, capable of transforming the pulses $W_3$ into a "loop state" (for the duration of the pulse $W_3$) and a "non-loop state" (during the intervals), these states corresponding to a short circuit or to an opening of a two-wire line $LR_j$ connected to the input of a receiver $R_j$ by way of a pulse transformer $TI_j$. The receiver $R_j$ described hereinafter, is capable of delivering, or not delivering, a pulse $W_4$ to its output $S_j$, depending upon whether the line $LR_j$ is open or closed.

In cases where the central unit is "duplicated", i.e. when there are two control units for handling the peripheral elements, a second set of generators $E_i$ and receivers $R_j$ may readily be introduced without any need for additional switching at the level of the lines $LE_i$ and $LR_j$. Branching points 15 and 16 towards a second control unit are shown in FIG. 1. Branching is possible without any need for decoupling by virtue of the isolation of the d.c potentials on the peripheral side and by virtue of the fact that the impedances branched at these points do not interfere with the transmission of pulses.

Figure 2:
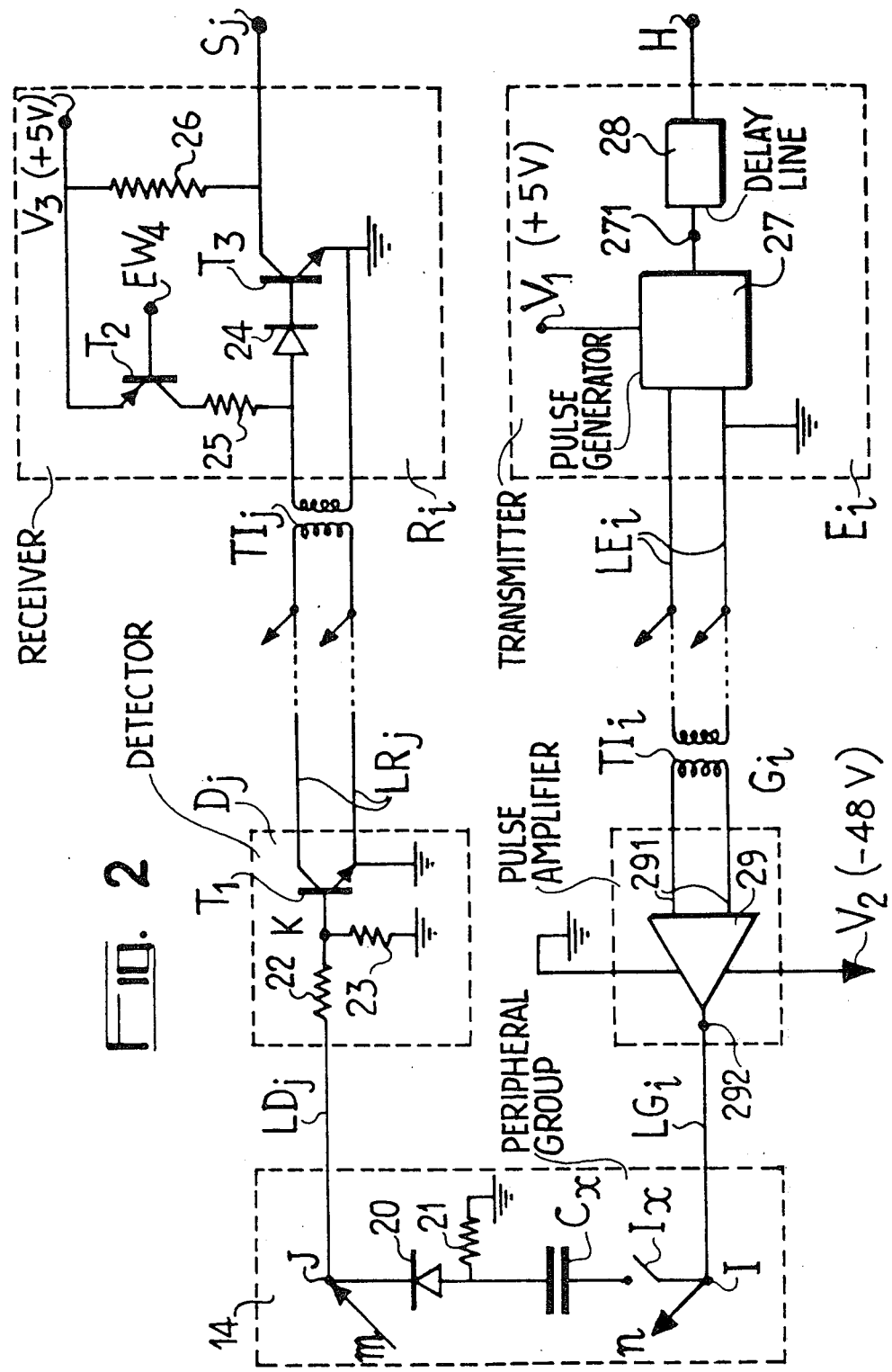
FIG. 2 diagrammatically illustrates an exemplary embodiment of the arrangement illustrated in FIG. 1.

In the embodiment illustrated in FIG. 2, it is assumed that the peripheral elements to be handled are telephone subscriber lines fed with a d.c voltage of 48 volts. The subscribers in question are, for example, subscribers with access to a switching matrix with m lines and n columns. At the point of intersection between a column i and a line j, there is a subscriber line of which FIG. 2 shows only two points I and J belonging to its two line wires, between which is connected a feed "bridge" based on a so-called central battery with a capacitor $C_x$ of the order of 1 microfarad. In addition, in the case of the arrangement according to the invention, a rectifier 20 is connected in series with the capacitor $C_x$ on the access side to the line $LD_j$, being oriented in such a way that only the positive pulses are able to pass towards the detector $D_j$ at which $LD_j$ terminates. A leakage resistance 21 connects the input of the rectifier 20 to the common earth of the complex 14, the amplifiers $G_i$ and the detectors $D_j$.

When the subscriber line is open, the capacitor $C_x$ is not charged, which is represented by an open switch $I_x$. By contrast, the loop state corresponds to the "closed" position of the switch.

The elements $E_i$, $G_i$, $D_j$ and $R_j$ in the exemplary embodiment illustrates in FIG. 2 will now be described, their mode of operation being explained at the same time.

The pulse generator $E_i$ comprises a circuit 27 for generating pulses which can be synchronised by a clock signals, the clock (not shown) having an output at point H in FIG. 2. An adjustable delay line 28 is installed between the terminal H and a terminal 271 for synchronising the circuit 27. The two conductors of the line $LE_i$ are respectively connected to earth and to a positive d.c voltage source $V_1$ (+5 volts) connected to the line by the circuit 27 for the duration of the pulses $W_1$.

The amplifier $G_i$ is a pulse amplifier 29 of which the input 291 is fed by the secondary winding of the pulse transformer (ratio 1/1) $TI_i$, of which the primary winding is connected between the two wires of the line $LE_i$. The output 292 of the amplifier 29 is connected to the point I and is fed with −48 volts from a d.c voltage source $V_2$ feeding the amplifier 29 for the duration of the pulses $W_1$.

The detector $D_j$ comprises a transistor $T_1$ (type NPN) of which the base is connected to the centre point K of a bridge formed by the resistances 22 and 23 connected between the point J and earth. The emitter and the collector of the transistor $T_1$ are respectively connected to each of the wires of $LR_j$.

It can easily be seen that, when a positive pulse appears at J, a loop is produced on the line $LR_j$ as a result of the very low ohmic resistance between the collector and emitter of a NPN transistor when its base is positive.

The receiver $R_j$ comprises two transistors $T_2$ and $T_3$ of opposite types: PNP for $T_2$ and NPN for $T_3$. The emitter of $T_2$ is directly fed with positive d.c voltage ($V_3$ of +5 volts), whereas the collector of $T_3$ is fed by the same source through a load resistance 26. The arrangement is such that the pulses, similar to $W_4$ but of lower amplitude, are introduced at the base of $T_2$ through a terminal $EW_4$, producing potential pulses at the base of $T_3$ by virtue of the load resistance 25 on condition that there is no loop in the line $LR_j$ because this would short circuit the base of $T_3$. Thus, in the non-loop state of $LR_j$, pulses $W_4$ appear at $S_j$. The rectifier 24 is connected between $TI_j$ and the base of the transmitter to ensure operational reliability, even in the event of parasitic pulses.

One advantage of the invention which has not yet been mentioned is the fact that the transistor $T_1$ short circuits the primary winding of the transformer $TI_j$ without any current being supplied to this transistor. In this way, the transformer $TI_j$ is prevented from being saturated with the direct current.

In addition, the brevity of the pulses $W_4$ prevents the transformer $TI_j$ from being saturated and reduces the probability of premature action of a parasitic voltage.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of monitoring a network of n groups of m peripheral elements, m being an integer greater than 1 and n an integer greater than 2, said elements being handled by an electric control unit, said network being of the type in which the state of each element may be expressed in the form of a binary digit collected on each of m separate channels, wherein said method comprises:

transmitting along $n$ two-wire channels test pulses recurring in a recurrence interval, corresponding test pulses on the $n$ two-wire channels being staggered as a function of time relative to one another by an interval equal at most to the nth part of the recurrence interval of said test pulses, each two-wire channel comprising means for decoupling d.c. potentials;

translating the state of an element $j$ ($j$ = integer variable from 1 to $m$) of any one of the $n$ groups of $m$ elements in the form of a loop state or non-loop state of a two-wire line connecting the network of $n$ groups of $m$ elements to the control unit, each "loop" state being synchronous with a test pulse; and using the loop states for stopping the transmission of pulses through a receiver ($R_j$), the non-loop states releasing the same transmission.

2. A method as claimed in claim 1, wherein the said means for decoupling d.c potentials are in the form of a pulse transformer.

3. A method as claimed in claim 1, wherein a pulse transformer is installed in each two-wire line connecting the network of elements to the control unit.

4. A method as claimed in claim 1, wherein the loop and non-loop states of the two-wire line are determined by the action of a bipolar transistor of which the emitter and collector are respectively connected to each of the wires of the two-wire line and of which the base is controlled by potential pulses coming from said network of $n$ groups of $m$ elements.

5. A method as claimed in claim 4, wherein each test pulse ($W_1$, FIG. 3) is transformed into a pulse ($W_2$) of the same duration, but different amplitude, by decoupling a d.c voltage feeding the network of elements, the latter transforming the pulses ($W_2$) of zero or non-zero amplitude according to the state of the element.

6. A method as claimed in claim 5, wherein it is used for monitoring the loop state of subscriber lines fed with d.c voltage by means of a feed bridge, the pulses ($W_2$) being transmitted through the capacitor of the feed bridge which converts them into pulses ($W_3$).

7. In an electronic telephonic switching system, apparatus for monitoring a network of peripheral elements handled by an electronic control unit comprising:

$n$ generators of test pulses ($W_1$) synchronized by a clock with a different delay for each of the generators, said generators forming part of the control unit;

$n$ pulse amplifiers controlled by said $n$ generators and delivering pulses ($W_2$) of the same duration as ($W_1$) but staggered in amplitude and in voltage, the amplifiers forming part of the network of elements;

$m$ pulse detectors each comprising a bipolar transistor forming part of the network of elements;

$m$ receivers forming part of the control unit, each of them comprising input terminals connected by a pulse transformer to the emitter and collector, respectively, of said bipolar transistor, an input terminal for pulses synchronized with the test pulses, an output terminal for pulses ($W_4$) and a pulse amplifying circuit comprising two complementary transistors.

* * * * *